3,228,945
Patented Jan. 11, 1966

3,228,945
6-METHYL- AND 1,6-DIMETHYL-8-(α-HYDROXY-ALKYL)-ERGOLINE I DERIVATIVES
Bruno Camerino and Luigi Bernardi, Milan, Germano Bosisio, Palazzolo Milanese, and Onofrio Goffredo, Milan, Italy, assignors to Società Farmaceutici Italia, Milan, Italy, a corporation of Italy
No Drawing. Filed June 4, 1963, Ser. No. 285,245
Claims priority, application Italy, June 15, 1962, 12,092/62
9 Claims. (Cl. 260—285.5)

Our invention relates to 6-methyl- and 1,6-dimethyl-8-(α-hydroxy-alkyl)-ergoline I derivatives, which are pharmacologically useful per se and as intermediates for the synthesis of products having a therapeutic use and to the process of preparing them.

The new compounds of the invention have the formula:

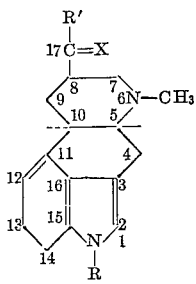

wherein:
R is hydrogen or methyl,
R' is methyl or ethyl,

X is $\begin{smallmatrix}H\\OR''\end{smallmatrix}$ (Rectus form) or $\begin{smallmatrix}OR''\\H\end{smallmatrix}$ (Sinister form) and, R'' is hydrogen atom or a radical of an aliphatic, cycloaliphatic, aromatic or heterocyclic carboxylic acid having from 1 to 10 carbon atoms.

Compounds of 6-methyl- and 1,6-dimethyl-ergoline I and II having a side chain of two or more carbon atoms in the 8-position have not previously been described.

The process of the invention comprises reducing 6-methyl- (or 1,6-dimethyl)-8-acyl-ergoline I (A) with a reducing agent, capable of reducing a keto group to a secondary alcohol group, preferably lithium aluminum hydride, to the corresponding crude 8-(α-hydroxy-alkyl)-6-methyl (or 1,6-dimethyl)-ergoline I (B) which consists of two stereoisomers at the 17 carbon atom. The two stereoisomers, called "Rectus" and "Sinister" according to the convention of Ingold, Cahn and Prelog (Experientia, 12, 1956, page 81), may be acylated at the 17-hydroxy group.

The process of the invention may be illustrated by the following scheme:

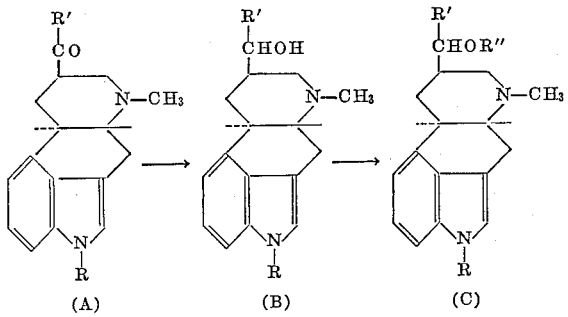

wherein:
R is a hydrogen atom or a methyl radical,
R' is a methyl or ethyl radical, R'' is the radical of an aliphatic, cycloaliphatic, aromatic or heterocyclic carboxylic acid having from 1 to 10 carbon atoms.

6-methyl- and 1,6-dimethyl-8-acyl-ergoline I (A), the starting compounds for the process of the invention, may be prepared by reacting dihydrolysergamide or 1-methyl-dihydrolysergamide with an alkyl magnesium bromide to yield the corresponding mixed alkyl-ergoline ketone (A).

The symbol "I," which follows the names of ergoline derivatives herein, has the usual meaning that the hydrogen in the 10-position has the α-configuration.

The reduction of said mixed alkyl-ergoline ketone to the corresponding secondary alcohol (B) is preferably performed with lithium aluminum hydride, in an inert solvent such as an ether, for example, ethyl ether, propyl ether, tetrahydrofuran, or ethyleneglycol dimethylether. The reduction is generally carried out at room temperature, but is preferably completed in the warm. The 8-(α-hydroxy-alkyl)-6-methyl- (or 1,6-dimethyl)-ergoline I (B) thus obtained, consists of a mixture of two C–17 stereoisomeric forms. The two forms may be separated by fractional crystallization or by chromatography. Both the stereoisomers R and S may be acylated with an acylating agent, such as the anhydride or the chloride of an aliphatic, cycloaliphatic, aromatic or heterocyclic carboxylic acid having from 1 to 10 carbon atoms, optionally in the presence of a tertiary amine such as pyridine, dimethylaniline, diethylaniline, triethylamine or their homologues. The acylation may be carried out on the mixture of the two stereoisomers and the two stereoisomeric acyl derivatives thereafter separated by fractional crystallization or by chromatography. Typical examples of acyl derivatives, prepared according to the invention, are the derivatives of acetic, propionic, butyric, valerianic, hexanoic, heptanoic, octanoic, decanoic, cyclopentane-carboxylic, cyclopentylpropionic, succinic, benzoic, 2,6-dimethoxy-benzoic, 3,4,5-trimethoxy-benzoic, phenyl-propionic, phenoxyacetic, α-phenoxy-propionic, ethyl-carbamic, nicotinic acids and their analogues.

The products of the invention are crystalline, colorless or yellow-colored solids, soluble in the usual organic solvents and in acids.

The products of the invention show a good pharmacological activity and they are particularly useful as oxytocic, antienteraminic, adrenolytic, hypotensive and sedative drugs.

The following examples illustrate but do not limit the invention.

EXAMPLE 1

1,6-dimethyl-8-(α-hydroxy-ethyl)-ergoline I R and S 4 g. of 8-acetyl-1,6-dimethylergoline I are refluxed for 3 hours with 205 cc. of anhydrous tetrahydrofuran and 4 g. of lithium aluminum hydride. After cooling the mixture, some aqueous tetrahydrofuran is added to the mixture to destroy the excess reducing agent. The mixture is then filtered. The resulting solution is evaporated in vacuo to dryness, and leaves 4.120 g. of residue. This residue consists of a mixture of two epimeric forms with stereoisomerism at the 17-carbon atoms. The two forms are separated by chromatography or by fractional crystallization; the residue is dissolved in the smallest possible quantity of ethyl ether, and, when dissolution is complete, the wall of the container is scratched with a glass rod to initiate crystallization. The first crop of crystals obtained consists of the pure stereoisomer R, melting at 181–183° C.; $[\alpha]_D^{20} = -108°$ (c.=0.4 in pyridine); yield 2.02 g.

By concentrating the mother liquor to one-third of its volume, 0.210 g. of crystalline product consisting of a mixture of the two isomers separates; it melts at 135–160° C. By further concentrating to a small volume, the epimer S separates, melting at 147–149° C.; $[\alpha]_D^{20} = -87°$ (c.=0.35 in pyridine); yield 0.930 g.

EXAMPLE 2

*1,6-dimethyl-8-(α-benzoyloxy-ethyl)-ergoline I R*

1 cc. of benzoyl chloride is added to 0.4 g. of 1,6-dimethyl-8-(α-hydroxy-ethyl)-ergoline I R in 15 cc. of anhydrous pyridine with stirring at room temperature. After 30 minutes, 1 cc. of water and 1 cc. of methanol are added and the mixture is stirred for one hour at room temperature. The mixture is extracted with chloroform, and washed in sequence with 1% aqueous sodium hydroxide solution, 5% aqueous sodium bicarbonate solution and water. The extracts are dried over anhydrous sodium sulphate, and the solvent is distilled off in vacuo. By recrystallizing the residue from acetone-petroleum ether, 0.380 g. of product, melting at 87–89° C., is obtained; $[\alpha]_D^{20} = -60°$ (c.=0.35 in pyridine).

EXAMPLE 3

*1,6-dimethyl-8-(α-benzoyloxy-ethyl)-ergoline I S*

The preparation is carried out in the same way as in Example 2, but by employing the stereoisomer S. 1,6-dimethyl-8-(α-benzoyloxy-ethyl)-ergoline I S is obtained. Isolated as the maleate, it melts at 165–168° C. (with decomposition); $[\alpha]_D^{20} = -37°$ (c.=0.47 in pyridine).

EXAMPLE 4

*1,6-dimethyl-8-(α-nicotinoyloxy-ethyl)-ergoline I R*

The preparation is carried out in the same way as in Example 2, but employing nicotinic acid chloride as the acylating agent. 1,6-dimethyl-8-(α-nicotinoyloxy-ethyl)-ergoline I R is obtained. Isolated as the maleate, it melts at 173–175° C. (with decomposition); $[\alpha]_D^{20} = -58°$ (c.=0.4 in pyridine).

EXAMPLE 5

*1,6-dimethyl-8-(α-nicotinoyloxy-ethyl)-ergoline I S*

The preparation is carried out in the same way as in Example 4, but by employing the stereoisomer S. 1,6-dimethyl-8-(a-nicotinoyloxy-ethyl)-ergoline I S is obtained. Isolated as the maleate, it melts at 115–117° C.; $[\alpha]_D^{20} = -39°$ (c.=0.53 in pyridine).

EXAMPLE 6

*1,6-dimethyl-8-(α-hydroxy-ethyl)-ergoline I R N-ethylcarbamate*

To a solution of 0.4 g. of 1,6-dimethyl-8-(α-hydroxy-ethyl-ergoline I R in 15 cc. of anhydrous pyridine, 0.8 cc. of ethyl isocyanate are added and the mixture is heated for 8 hours at 100° C. After cooling to room temperature, 1 cc. of water is added and the mixture is allowed to stand over night, and is then evaporated in vacuo to dryness. The residue to taken up with chloroform and the resulting solution is extracted thoroughly with a dilute aqueous solution of tartaric acid. The aqueous acidic extract is made alkaline with dilute sodium hydroxide and extracted with chloroform. The chloroform extracts are washed in sequence with a 5% aqueous sodium bicarbonate solution and with water. The product is dried over anhydrous sodium sulphate and the solvent is evaporated in vacuo to dryness. By recrystallization of the residue from ethyl ether, 0.380 g. of 1,6-dimethyl-8-(α-hydroxy-ethyl)-ergoline I R N-ethylcarbamate, melting at 175–177° C. is obtained; $[\alpha]_D^{20} = -100°$ (c.=0.27 in pyridine).

EXAMPLE 7

*1,6-dimethyl-8-(α-hydoxy-ethyl)-ergoline I S N-ethylcarbamate*

The preparation is carried out in the same way as in Example 6, but employing the stereoisomer S. 1,6-dimethyl-8-(α-hydroxy-ethyl)-ergoline I S N-ethylcarbamate, melting at 212–213° C., is obtained; $[\alpha]_D^{20} = -105°$ (c.=0.36 in pyridine).

EXAMPLE 8

*Derivatives of 6-methyl-8-(α-hydroxy-ethyl)-ergoline I*

By employing 6-methyl-8-acetyl-ergoline I as the starting material instead of 1,6-dimethyl-8-acetyl-ergoline I and by operating as in the above examples, the corresponding derivatives of 6-methyl-8-(α-hydoxy-ethyl)-ergoline I are obtained.

EXAMPLE 9

*Derivatives of 6-methyl and of 1,6-dimethyl-8-(α-hydroxy-propyl)-ergoline I*

By employing 6-methyl and 1,6-dimethyl-8-propionyl-ergoline I as the starting material instead of 1,6-dimethyl-8-acetyl-ergoline I and operating as in Examples 1 to 7, the corresponding derivatives of 6-methyl and of 1,6-dimethyl-8-(α-hydroxy-propyl)-ergoline I are obtained.

We claim:

1. A compound of the formula:

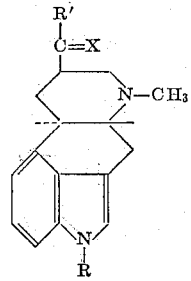

wherein:

R is selected from the group consisting of hydrogen and methyl,

R' is selected from the group consisting of methyl and ethyl,

X is selected from the group consisting of $\begin{subarray}{c}\diagup H \\ \diagdown OR''\end{subarray}$ and $\begin{subarray}{c}\diagup OR'' \\ \diagdown H\end{subarray}$, and R" is selected from the group consisting of hydrogen and an acyl group of an acid selected from the group consisting of (a) substituted and unsubstituted saturated aliphatic acids with up to 10 carbon atoms, wherein the substituent is selected from the group consisting of phenyl and phenoxy;

(b) saturated cycloaliphatic acids with up to 8 carbon atoms, wherein the cycloaliphatic ring has 5 carbon atoms;

(c) substituted and unsubstituted benzoic acid, wherein the substituent is alkoxy of which the alkyl is from 1 to 4 carbon atoms; and (d) nicotinic acid.

2. 1,6-dimethyl-8-(α-hydroxy-ethyl)-ergoline I R.
3. 1,6-dimethyl-8-(α-hydroxy-ethyl)-ergoline I S.
4. 1,6-dimethyl-8-(α-benzoyloxy-ethyl)-ergoline I R.
5. 1,6-dimethyl-8-(α-benzoyloxy-ethyl)-ergoline I S.
6. 1,6-dimethyl-8-(α-nicotinoyloxy-ethyl)-ergoline I R.
7. 1,6-dimethyl-8-(α-nicotinoyloxy-ethyl)-ergoline I S.
8. 1,6-dimethyl-8-(α-hydroxy-ethyl)-ergoline IR-N-ethylcarbamate.
9. 1,6-dimethyl-8-(α-hydroxy-ethyl)-ergoline IS-N-ethylcarbamate.

References Cited by the Examiner

Burger: Medicinal Chemistry, pp. 585–6 and 622 (1960).

Stoll et al.: Helv. Chim. Acta, vol. 32, pp. 1947-56 (1949).

Wheland: Advanced Organic Chemistry, 2d ed., p. 373 (1949).

NICHOLAS S. RIZZO, *Primary Examiner.*